United States Patent [19]

Arai et al.

[11] Patent Number: 4,693,555
[45] Date of Patent: Sep. 15, 1987

[54] DEVICE FOR HOLDING AN IMAGING LENS

[75] Inventors: Noboru Arai; Takekazu Yanagimoto, both of Ashigara-Kami, Japan

[73] Assignee: Fuji Photo Film Co., Ltd., Kanagawa, Japan

[21] Appl. No.: 789,291

[22] Filed: Oct. 18, 1985

[30] Foreign Application Priority Data

Oct. 19, 1984 [JP] Japan .................. 59-218289

[51] Int. Cl.$^4$ .............................................. G02B 7/02
[52] U.S. Cl. .................................................... 350/253
[58] Field of Search ............... 350/253, 252, 247, 255, 350/6.6, 6.8

[56] References Cited

U.S. PATENT DOCUMENTS

| | | | |
|---|---|---|---|
| 3,333,472 | 8/1967 | McLellen | 92/1 |
| 4,147,413 | 4/1979 | Sims et al. | 350/253 |
| 4,236,790 | 12/1980 | Smith | 350/253 |
| 4,525,745 | 6/1985 | Gaem-Maghami et al. | 350/253 |
| 4,609,945 | 9/1986 | Oguino | 350/253 |

Primary Examiner—John K. Corbin
Assistant Examiner—Loha Ben
Attorney, Agent, or Firm—Sughrue, Mion, Zinn, Macpeak, and Seas

[57] ABSTRACT

An imaging lens holder device for use in an optical information recording apparatus is disclosed. The device comprises a focus adjusting member having a coefficient of thermal expansion with a value larger than that of the coefficient of thermal expansion of a supporting leg with a ledge and a leg member for supporting a holder for a member to be scanned. Respective leg materials are so selected that an increment caused by thermal expansion between the surface of the ledge opposite to the substrate and the surface of the member to be scanned and an increment of the focus adjusting member in the direction to the substrate caused by thermal expansion in case of using the ledge surface as a reference surface, are made equal to each other.

9 Claims, 7 Drawing Figures

FIG._4A 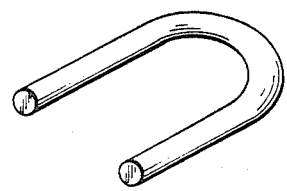
FIG._4B 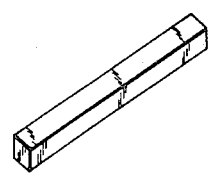
FIG._4C 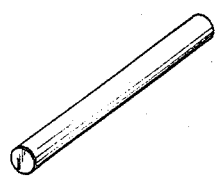
FIG._4D 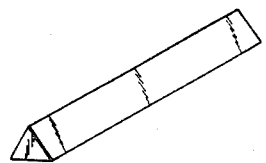

DEVICE FOR HOLDING AN IMAGING LENS

BACKGROUND OF THE INVENTION

1. Field of the Invention

The present invention relates to a device for holding an imaging lens, more particularly an imaging lens holder for use in an optical information recording apparatus capable of being susceptible to the effect of temperature rise, such as a camera section of a laser recording apparatus.

2. Description of Prior Art

Various optical scanning types of information recording apparatus have been developed in which information is recorded under the control of clock signals produced by optically scanning an optical linear encoder.

As such an information recording apparatus, a computer output microfilm apparatus (referred to as "laser-COM" hereinafter) is known, in which print data (variable information) supplied from the computer and desirable form data (fixed information) are recorded on microforms by employing a laser beam as scanning light.

An optical scanning system of the above-described laser-COM will now be summarized with reference to FIG. 1.

An argon (Ar) laser 1 emits blue green light beams for recording purposes, which are indicated by "B". The blue green light beams B are intensity-modulated in an optical modulator 2 by video signals (will be discussed later) and thereafter pass through a first dichroic mirror 3. A helium-neon (He - Ne) laser 4 emits red light beams for reading purposes, which are denoted by "R". The red light beams R are incident upon a first reflecting mirror 5 and reflected therein and thereafter incident on the first dichroic mirror 3. The red light beams R are reflected on the first dichroic mirror 3 and mixed with the other light beams for recording purposes that have passed through this dichroic mirror 3. The combined light beams are incident on a rotating polyhedric mirror 7 through a second reflecting mirror 6. In this case, the first dichroic mirror 3 is designed to pass the blue and green light beams therethrough and to reflect the red light beams thereon.

The rotating polyhedric mirror 7 is rotated in a predetermined direction at a constant rate by a motor 9 to which a power is supplied from a motor drive circuit 8. As a result, the combined light beams R, B incident upon the respective mirror surface of the rotating polyhedric mirror 7 are reflected on these mirror surfaces and simultaneously deflected (referred to as "horizontal-deflected beams"). Then, the mixed light beams are converted into primary scanning light having a repetition period that is defined by the beam reflections occur in the respective mirror surfaces of the rotating polyhedric mirror 7. The primary scanning light is incident upon a second dichroic mirror 11 via a convergent optical system 10. The second dichroic mirror has such characteristics that the recording blue-green light beams and the reading red light beams can be transmitted therethrough and a part of the reading red light beams can be reflected thereon. Accordingly, in the mixed light beams incident upon the second dichroic mirror 11, both the blue-green light beams B and the red light beams R pass toward a galvanometer 12, and the red light beams R are partially reflected and incident upon a linear encoder 13.

In response to saw-tooth driving signals supplied from a galvanometer driver 14, the galvanometer 12 deflects the recording light beams R, B in a direction substantially perpendicular to the horizontal deflecting direction (referred to as "vertical deflection"). As described above, the galvanometer driver 14 produces the saw-tooth driving signals based upon clock signals derived from a clock signal generator 15 (will be discussed later). For instance, counting these clock signals in a vertical address signal generator 16 in the vertical deflection period enables the vertical address signals to be produced. In response to these address signals, the galvanometer driver 14 produces the above-described saw-tooth driving signals.

Since the blue green light beams and also the red light beams vertically deflected by the galvanometer 12 have been converted into the one dimensional scanning light by the rotating polyhedric mirror 7, they become two dimensional scanning light by means of such vertical deflections. Then, the two dimensional scanning light is incident upon a third dichroic mirror 17, thereby splitting it into the blue green light and the red light.

The two dimensional scanning light of the blue green light beams passing through the third dichroic mirror 17 is focused on recording materials such as films via a focusing optical system 18 to raster-scan them. The other two dimensional scanning light of the red light beams split by the third dichroic mirror 17 is incident upon a form slide film 20A via a third reflecting mirror 19.

In a form slide film device 20, a plurality of form slide films 20A, 20B,—, 20N (N being number) are preset which are the most useable. Different slide images and writing frames constituted by a plurality of vertical and horizontal lines are recorded on these slide films 20A, 20B,—, 20N. For the sake of simplicity, only two form slide films 20A and 20B are illustrated. One of these form slide films is selectively moved to a scanning position where it is scanned by the above two dimensional scanning light. As desired, the form slide films 20A, 20B,—, 20N are arbitrarily detachable from the form slide device 20.

As seen from FIG. 1, the two dimensional scanning light R passes through the form slide film 20A and is converted in a first photomultiplier 21 to electric readout signals. The readout signals correspond to video signals of the writing frame image of the scanned form slide film 20A.

The red light beams R split by the second dichroic mirror 11 are, on the other hand, incident upon a linear encoder 13 to be one-dimensional-scanned. The linear encoder 13 is formed by a plurality of transparent and non-transparent line-shaped grids which are aligned parallel to the horizontal deflection direction and equidistantly separated to form a straight striped pattern. Pulsatory light obtained by scanning this linear encoder 13 by means of the horizontal deflection scanning light is converted by a second photomultiplier 22 into pulse signals as clock pulse signals. By applying these clock pulse signals to a phase-coupling type clock signal oscillator 23, clock signals are oscillated. The clock signals are used to synchronize the respective circuit elements of the laser-COM with each other under the desirable timings. The linear encoder 13, second photomultiplier 22, and clock signal oscillator 23 constitute a clock signal generating device 15.

Under the timing control of the clock signals derived from the clock signal generating device 15, character information corresponding to coded data from the character information source such as magnetic tapes etc. can be read out from a character generator 24 as video signals. These video signals derived from the character generator 24 are supplied to a signal composite circuit 25. While the form signals that are obtained by amplifying outputs of the first photomultiplier 21 in the amplifier 26 and thereafter shaping them in a level slicer 27 are supplied to the signal composite circuit 25, the above video signals are combined with the form signals in the signal composite circuit 25.

Thus the composite video signals are supplied through a modulator drive circuit 28 to the optical modulator 2 so as to intensity-modulate the recording light beams. As easily seen, the raster-scanned image projected toward the film F corresponds to an image formed by that the print data derived from the computer is written in a given position of the form frame selected by the form slide film.

In such an optical information recording apparatus for recording data on the photosensitive member with the laser light, the temperature rise of the imaging optical system for imaging the scanning light onto the film surface becomes large because of irradiation of the laser light, so that the holder mechanism for holding the optical system expanded on heating. The problem of such a thermal expansion is allowed to stand without paying any special attention and there is not taken any countermeasure against such a problem.

Generally, the imaging lens for use in the camera section of the information recording apparatus has very narrow allowable depth of focus, for example, with a precision of 10 μm or less, so that when using laser light beam the imaging lens is susceptible to the effect of heat and thus the area of focus depth is deviated to the outside of surface of the photosensitive material due to thermal expansion of the imaging lens holding member, thereby causing a defocusing of the lens, resulting in a decrease of resolution or definition.

SUMMARY OF THE INVENTION

It is an object of the present invention to overcome the disadvantage of the conventional imaging lens holder device.

It is another object of the present invention to provide an imaging lens holder device with comparatively simple construction.

According to the present invention there is provided a device for holding an imaging lens comprising a substrate, a holder for supporting a member to be scanned at the position away from a certain distance out of the substrate surface by leg members extended from the substrate surface, supporting legs extended from the other surface of the substrate, ledges secured to the other ends of the supporting legs, focus adjusting members provided on the surfaces of the ledges opposite to the substrate, and an imaging lens supported on the focus adjusting member in such a manner that an image is projected with infocusing on the surface of the member to be scanned which is held on the holder, through an optical window provided in the substrate.

According to the present invention, the material of the focus adjusting member has a coefficient of thermal expansion having a value larger than that of coefficient of thermal expansion of materials forming the supporting leg with the ledge and leg member for supporting the holder for a member to be scanned. Respective materials are so selected that an increment caused by thermal expansion between the surface of the ledge opposite to the substrate and the surface of the member to be scanned and an increment of the focus adjusting member in the direction to the substrate caused by thermal expansion in case of using the ledge surface as a reference surface, are made equal to each other. When the surface of the member to be scanned is moved in the direction moving away from the imaging lens due to thermal expansion of respective materials the imaging lens is moved in the direction following thereto so that imaging surface of the lens may always hold the position corresponding to the surface of the member to be scanned.

BRIEF DESCRIPTION OF THE DRAWINGS

The invention will now be described with reference to the accompanying drawings wherein:

FIGS. 4A to 4D are perspective views showing the constructional form of the focus adjusting member used in the device shown in FIG. 2.

DESCRIPTION OF THE PREFERRED EMBODIMENTS

Figure 2:
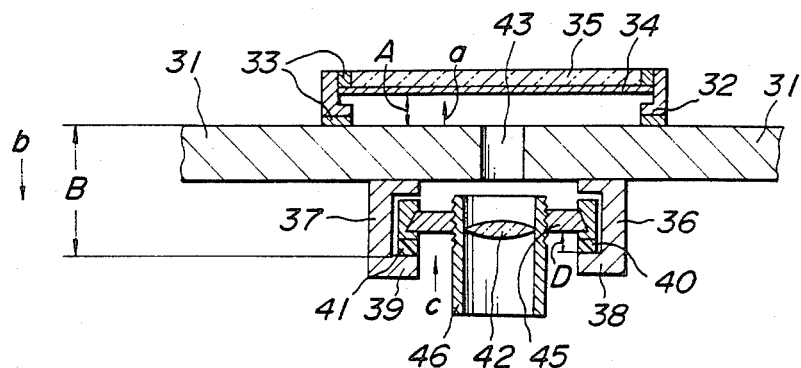
FIG. 2 is a fragmentary sectional view showing one embodiment of a device for holding an imaging lens according to the present invention.
Figure 3:
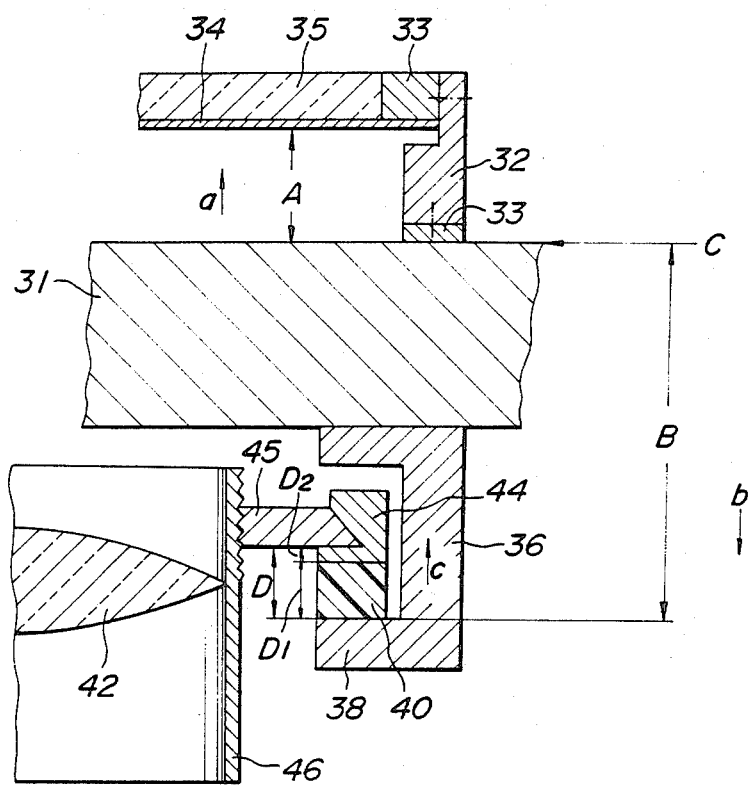
FIG. 3 is an enlarged fragmentary sectional view showing the essential portion of the device shown in FIG. 2.

Referring to FIGS. 2 and 3, wherein like reference characters designate like or corresponding parts, there is shown an embodiment of a device for holding an imaging lens according to the present invention.

Reference numeral 31 is a substrate of, for example, aluminum casting, for which a holder for a member to be scanned, for example, a film adsorption stage 35 of glass is provided by leg members 32 and 33 of, for example, aluminum or Teflon (trade name of Du Pont) which are extended from one surface of the substrate 31. The stage 35 holds a member to be scanned, for example, a film 34 consisting of a heat mode recording material with a metal deposition thin film at a distance A apart from the surface of the substrate 31. The stage 35 is slidably held by the leg members 32, 33 to the substrate 31.

Figure 1:
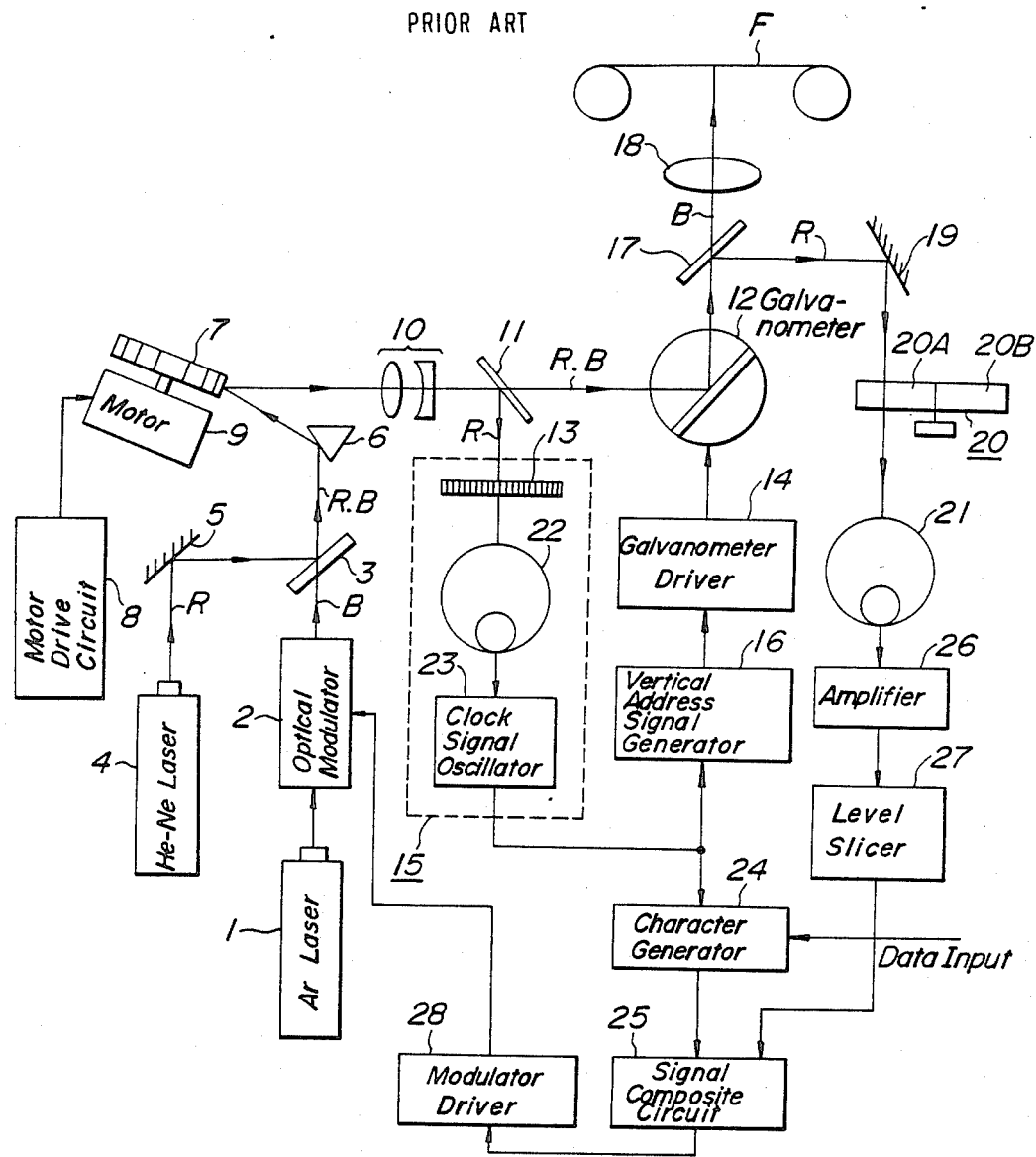
FIG. 1 is a diagram showing the construction of general laser COM.

The substrate 31 is provided with supporting legs 36 and 37 of, for example, aluminum which are extended from the other surface of the substrate 31 in the opposite direction to the leg members 32 and 33. The supporting legs 36 and 37 have ledges 38 and 39 at the other end thereof, respectively, which are integrally formed therewith. Focus adjusting member 40 and 41 are placed on and fixed to the surfaces of the ledges 38 and 39 opposite to the substrate 31, respectively. The focus adjusting members 40 and 41 may consist of, for example, polycarbonate, polyacetal, or the other suitable materials. An imaging lens 42 is supported on and fixed to the surfaces of the focus adjusting members 40 and 41 opposite to the substrate 31 in such a manner that a projection image formed by the imaging lens 42 is formed on the surface of the film 34 through an optical window 43 formed in the substrate 31. The imaging lens 42 corresponds to the imaging optical system 18 shown in FIG. 1. In this embodiment, as shown in FIG. 3, the imaging lens 42 is fixed in a lens holding cylinder 46, and this cylinder is threaded in a center opening of a plane lens fixing board 45 which is slidably held on lens guide rails 44 fixed onto the focus adjusting members 40 and 41.

In the above construction, provided that the surface of the substrate 31 opposite to the film 34 is referred to as a first reference surface C and a coefficient of linear expansion in a linear expansion direction of respective members due to heating is positive, the surface of the film 34 is shifted or moved in a direction of an arrow a so that the distance A between the first reference surface C and the film surface is increased by la mm/°C. The surfaces of the focus adjusting member 40 and 41, opposite to the ledges 38 and 39, respectively are moved from the first reference surface C in the direction of an arrow b due to thermal expansion of the substrate 31 and the supporting legs 36 and 37 so that the distances B between the first reference surface C and the ledge surfaces are increased by lb mm/°C. However, provided that the surfaces of the focus adjusting members 40 and 41 opposite to the ledges 38 and 39 are referred to as second reference surface which has been moved in the direction of the arrow b, these surfaces of the focus adjusting members 40 and 41 are moved in the direction of an arrow c, that is, in the same direction as the moving direction a of the film 34 so that the distance D between the second reference surface and the surface of the lens fixing board 45 opposite to the focus adjusting member 40 is increased by ld mm/°C., that is, the sum of the increase $ld_1$ mm/°C. of the focus adjusting member 40 and the increase $ld_2$ mm/20 C. of the lens guide rail 44. This increment ld corresponds to a sum of increments la and lb.

According to the present invention, if the focus adjusting members 40 and 41 are formed by a material having a coefficient in such a manner that respective increments la, lb and ld satisfy the following equation (1) and having a dimension in the direction to the substrate 31, the defocusing of the imaging lens 42 caused by thermal expansion on the underside of the film can be adjusted completely.

$$la + lb - ld = 0 \qquad (1)$$

wherein $ld = (ld_1 + ld_2)$.

For example, in the practical embodiment provided that aluminum having the coefficient of linear expansion of $2.36 \times 10^{-5}$/°C. is used as the material of the leg member 32, substrate 31 and the supporting legs 36 and 37 and polycarbonate, a kind of plastic having coefficient of linear expansion of $7.0 \times 10^{-5}$/°C. is used as material of the focus adjusting members 40 and 41, if the length of the leg member 32 has 20.0 mm and the total length of the thickness of the substrate 31 and the supporting leg 36 not including the ledge 38 is 80.0 mm, the length L of the focus adjusting member 40 and 41 at room temperature is obtained by following calculation.

$$L = \frac{2.36 \times 10^{-5} \times (20.0 + 80.0)}{7.0 \times 10^{-5}} = 33.71 \text{ (mm)}$$

If the focus adjusting member 40 and 41 are not used and when the ambient temperature is changed by 10° C. from the room temperature, the change in length S of the leg member 32, substrate 31 and the supporting leg 36 from an ambient temperature to a temperature raised by 10° C. can be obtained as follows $$S = 2.36 \times 10^{-5} \times (20.0 + 80.0) \times 10 = 23.6 \text{ (}\mu\text{m)}$$

This change of length S exceeds the range of the focus depth, 10 μm of the imaging lens 42 for the laser-COM. Then, if the focusing adjusting member 40 and 41 are used as the temperature deviation compensator and even though the ambient temperature is changed by 10° C. the defocused length DF of the device can be calculated as follows.

$$DF = 2.36 \times 10^{-5} \times (20.0 + 80.0) \times 10 - 7.0 \times 10^{-5} \times 33.71 \times 10 = 3.0 \text{ (}\mu\text{m)}$$

This defocused length is within the focus depth of the imaging lens 42.

In order to obtain the length L of the focus adjusting members 40 and 41, the machining precision of order of 10 μm is necessary but this precision can easily be obtained in the current machining technique.

The fine adjustment of focus can be performed by adjusting the threaded condition between the lens holding cylinder 46 and the lens fixing board 45. The material for use in the leg members 32, 33, the lens guide rail 44 which are constructed to slide them on the substrate surface and support the holder for the member to be scanned, is limited because of abrasion resistance, strength, or the like, so that the utilized material may be of a material other than the above described material. In this case, the quality and the dimension of the focus adjusting member 40 and 41, may be selected in accordance with only thermal property of the material to be utilized.

The constructional form of focus adjusting member is shown in FIGS. 4A to 4D. As shown in FIG. 4, the focus adjusting members 40 and 41 are formed as a separate member, but may be formed in a U shaped unit form (FIG. 4A). The focus adjusting members 40 and 41 may also be formed in a rod form having cross sections of a rectangular (FIG. 4B), a circular (FIG. 4C) or a triangular (FIG. 4D). The attachment or fixing of the focus adjusting member may be performed by adhesive or mechanical means.

As described above, according to the present invention the imaging lens holding device may adjust the defocusing of the imaging lens caused by thermal expansion of the holders for the photosensitive member or the imaging lens thereby obtaining a device having a comparative simple construction and capable of carrying out the adjustment with ease. If the device according to the present invention is applied to the camera section of the laser information recording device, it is possible to easily and completely prevent the decrease in resolution of the recorded image caused by defocusing of the imaging lens due to thermal expansion which can not be prevented by the conventional device.

What is claimed is:
1. An imaging lens holder device comprising:
 a substrate (31) having upper and lower surfaces and an optical window (43) therethrough;
 holding means (35) for supporting a member (34) to be scanned;
 leg members (32) extending from the upper surface of said substrate and attached to the holding means for supporting the holding means a predetermined distance from said substrate;
 supporting legs (36, 37) having first and second ends and being attached to the lower surface of the substrate by said first ends;

ledges (38, 39) having upper and lower surfaces and integrally attached to the second end of said supporting legs;

an imaging lens holding means having an imaging lens (42) disposed therein in such a manner that a projection image formed by the imaging lens is formed on a surface of the member to be scanned through the optical window of the substrate; and focus adjusting members (40,41) secured on the upper surfaces of said ledges and supporting the imaging lens holding means for correcting defocusing of the imaging lens resulting from dimensional change of the leg members, substrate and supporting legs due to changes in temperature.

2. An imaging lens holder device as set forth in claim 1 wherein the imaging lens holding means comprises:

a lens holding cylinder (46) having external threads and means for securing said imaging lens therein, lens guide rails (44) secured to said focus adjusting members, and lens fixing boards (45) secured to said guide rails and cooperating with the external threads of the lens holding cylinder to adjustably support the cylinder and imaging lens.

3. An imaging lens holder device as set forth in claim 1 wherein said focus adjusting members having a coefficient of thermal expansion with a value larger than the coefficient of thermal expansion of said substrate, said supporting legs and said leg members, to correct the defocusing of the imaging lens due to changes in temperature.

4. A device for holding an imaging lens as claimed in claim 1, wherein the focus adjusting members are formed as a separate member.

5. A device for holding an imaging lens as claimed in claim 1, wherein the focus adjusting members are formed in an U shaped unit form.

6. A device for holding an imaging lens as claimed in claim 1, wherein the focus adjusting members are formed in a rod form having various cross section.

7. A device for holding an imaging lens as claimed in claim 6, wherein the cross section of the rod form member is a rectangular, a circular or a triangular form.

8. A device for holding an image lens as claimed in claim 1, wherein the member to be scanned is a heat-mode recording film.

9. A device for holding an image lens as claimed in claim 1, wherein the member to be scanned is a photosensitive film.

* * * * *

UNITED STATES PATENT AND TRADEMARK OFFICE
CERTIFICATE OF CORRECTION

PATENT NO. : 4,693,555

DATED : September 15, 1987

INVENTOR(S) : ARAI et al

It is certified that error appears in the above-identified patent and that said Letters Patent is hereby corrected as shown below:

COLUMN 5, LINE 29  Delete "$1d_2 mm/20C$" and insert --$1d_2 mm/°C$--.

Signed and Sealed this

Twentieth Day of December, 1988

Attest:

DONALD J. QUIGG

Attesting Officer   Commissioner of Patents and Trademarks